Figure 1:
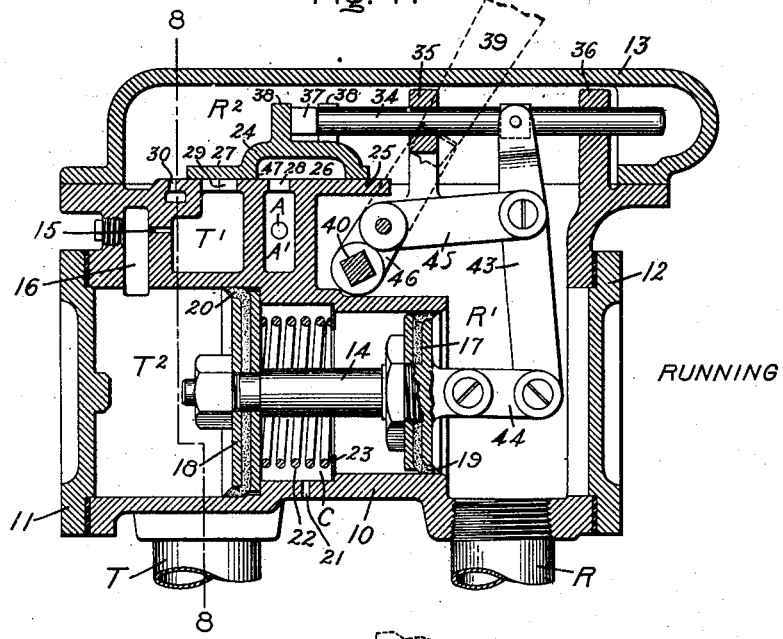

No. 755,751. PATENTED MAR. 29, 1904.
F. B. COREY.
MOTORMAN'S OR ENGINEER'S VALVE.
APPLICATION FILED AUG. 13, 1903.
NO MODEL. 5 SHEETS—SHEET 1.

RUNNING

SERVICE APPLICATION

Witnesses:
George H. Tilden.

Inventor:
Fred B. Corey.
by Albert H. Dam
Att'y.

No. 755,751. PATENTED MAR. 29, 1904.
F. B. COREY.
MOTORMAN'S OR ENGINEER'S VALVE.
APPLICATION FILED AUG. 13, 1903.
NO MODEL. 5 SHEETS—SHEET 2.

LAP

SLOW RELEASE

Witnesses:
George W. Tilden.
Helen Orford

Inventor:
Fred B. Corey.
by Allen S. Davis
Att'y.

No. 755,751. PATENTED MAR. 29, 1904.
F. B. COREY.
MOTORMAN'S OR ENGINEER'S VALVE.
APPLICATION FILED AUG. 13, 1903.
NO MODEL. 5 SHEETS—SHEET 3.
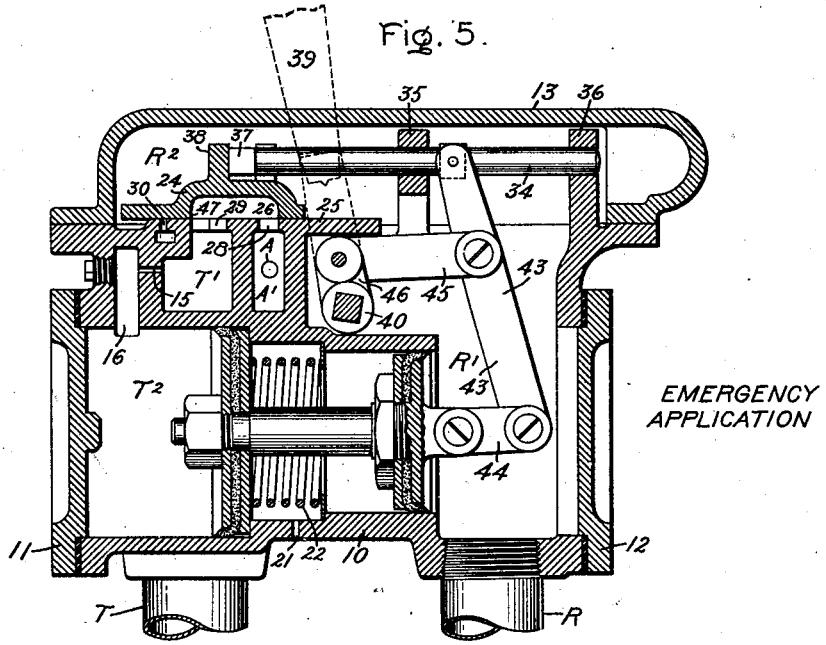
*EMERGENCY APPLICATION*
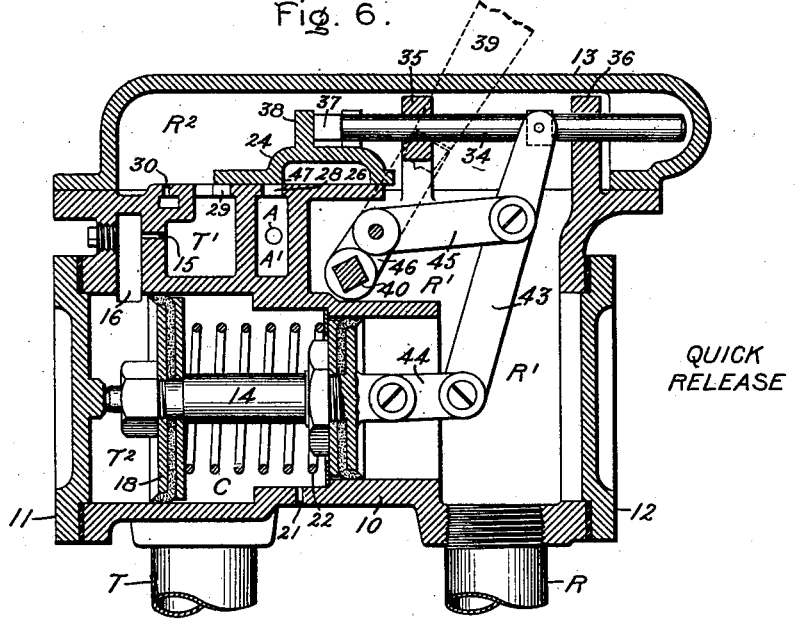
*QUICK RELEASE*
Witnesses:
George H. Tilden.
Helen Oxford.
Inventor:
Fred B. Corey.
by Albert H. Dean
Att'y.

No. 755,751. PATENTED MAR. 29, 1904.
F. B. COREY.
MOTORMAN'S OR ENGINEER'S VALVE.
APPLICATION FILED AUG. 13, 1903.
NO MODEL. 5 SHEETS—SHEET 4.

Witnesses:
George H. Tilden.
Helen Orford.

Inventor:
Fred B. Corey.
by Albert H. Dam
Att'y.

THE NORRIS PETERS CO., PHOTO-LITHO., WASHINGTON, D. C.

No. 755,751. PATENTED MAR. 29, 1904.
F. B. COREY.
MOTORMAN'S OR ENGINEER'S VALVE.
APPLICATION FILED AUG. 13, 1903.
NO MODEL. 5 SHEETS—SHEET 5.
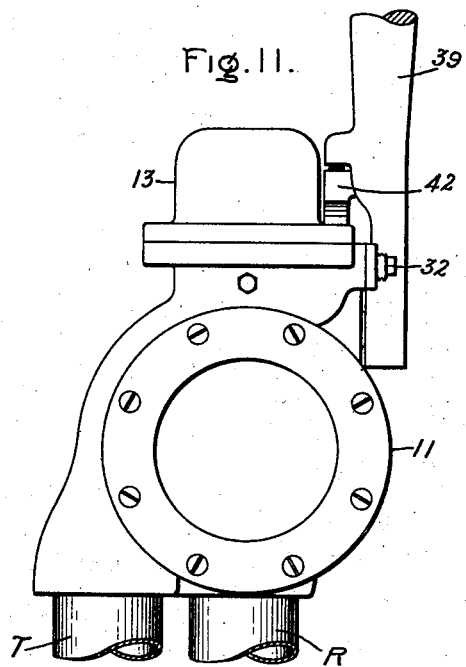
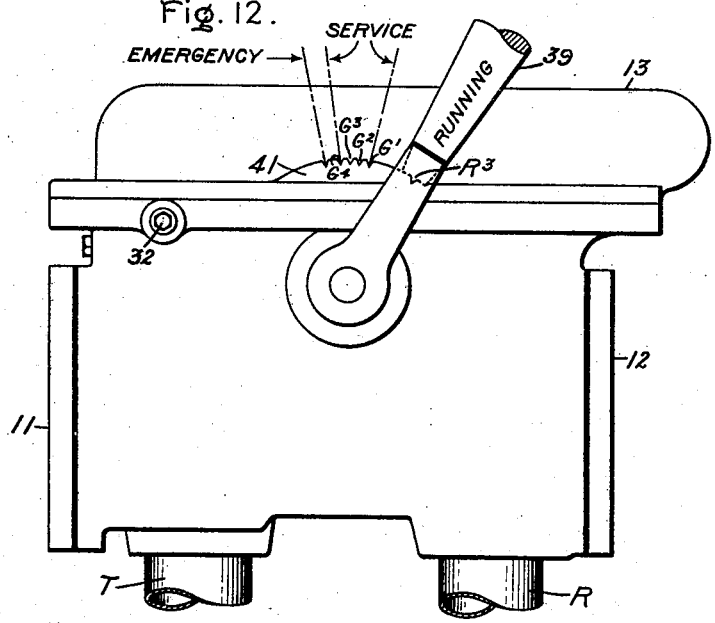
Witnesses:
George H. Tilden.
Helen Orford
Inventor:
Fred B. Corey
by Albert G. Davis
Att'y.

No. 755,751. Patented March 29, 1904.

UNITED STATES PATENT OFFICE.

FRED B. COREY, OF SCHENECTADY, NEW YORK, ASSIGNOR TO GENERAL ELECTRIC COMPANY, A CORPORATION OF NEW YORK.

MOTORMAN'S OR ENGINEER'S VALVE.

SPECIFICATION forming part of Letters Patent No. 755,751, dated March 29, 1904.

Application filed August 13, 1903. Serial No. 169,352. (No model.)

*To all whom it may concern:*

Be it known that I, FRED B. COREY, a citizen of the United States, residing at Schenectady, in the county of Schenectady and State of New York, have invented certain new and useful Improvements in Motormen's or Engineers' Valves, of which the following is a specification.

My invention relates to valves employed by motormen and engineers to control the application of the brakes in "automatic" air-brake systems—that is, systems in which the air-brakes are applied by reducing the pressure in the train-pipe and released by increasing said pressure; and it relates more particularly to that class known as "automatic" lap-valves, in which a definite movement of the controlling-lever causes a definite variation in train-pipe pressure by connecting the train-pipe to atmosphere or main reservoir and maintaining such connection until the change of pressure in the train-pipe automatically causes the valve to move to lap position, thereby cutting off the connection initially established.

One of the objects of my invention is to provide a controlling-valve which will perform all the functions required by valves of the above type with the use of a considerably less number of parts than is commonly employed.

Another object is to provide a novel valve the parts of which are so constructed and arranged that the controlling-handle may be set in advance for any predetermined train-pipe pressure and which is operable to obtain such predetermined pressure both in charging and discharging the train-pipe.

Other objects and advantages of my invention will be apparent upon consideration of the following detailed description, taken in connection with the accompanying drawings, in which—

Figure 7:
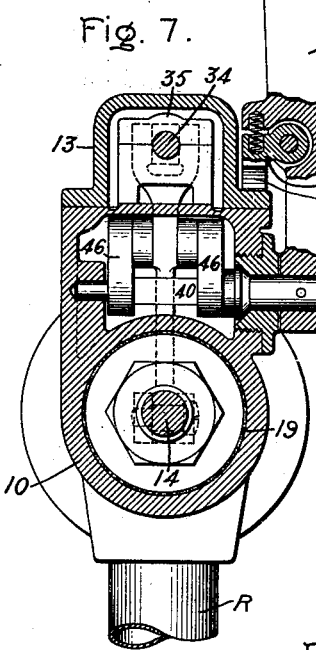
Figure 8:
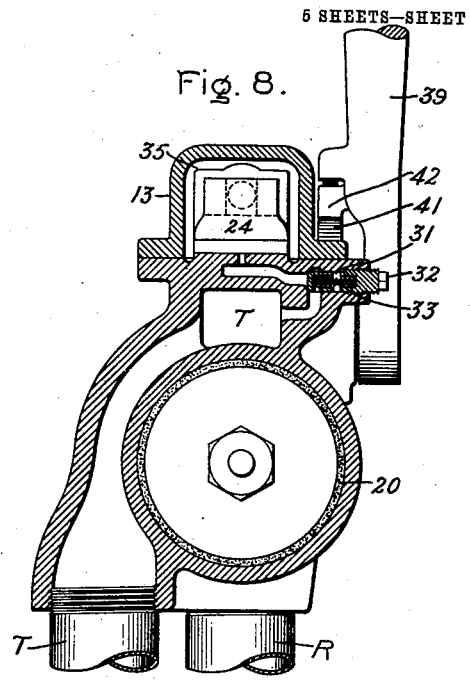
Figure 9:
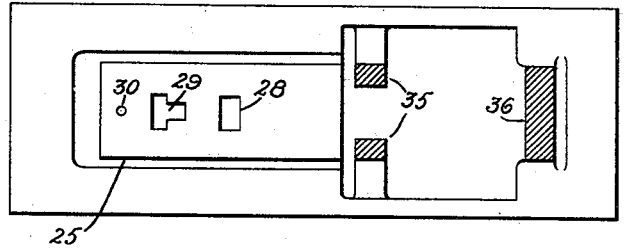
Figure 10:
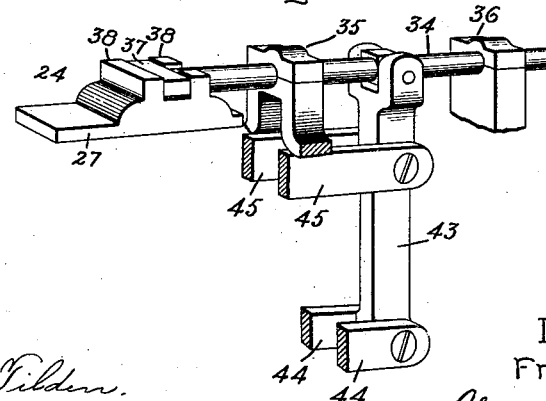

Figures 1, 2, 3, 4, 5, and 6 are like sectional views of a valve constructed in accordance with my invention, each view indicating a different operative position of the valve mechanism. Fig. 7 is a transverse section of the valve structure, taken on the line 7 7 of Fig. 2. Fig. 8 is a similar section taken on the line 8 8 of Fig. 1. Fig. 9 is a plan view of the slide-valve seat. Fig. 10 is a perspective view illustrating the slide-valve, guides for its stem, and the link mechanism by which it is operated. Fig. 11 is an end view of the complete valve structure, and Fig. 12 is a side view of the same.

Like characters refer to like parts throughout the several views.

The particular embodiment of my invention illustrated in the accompanying drawings, generally stated, comprises a slide-valve arranged to control the flow of air to and from the train-pipe, a piston constituting a movable partition between train-pipe and main-reservoir pressures, a hand or controlling lever and link mechanism connecting said valve, piston, and hand-lever, all of said parts being so located and arranged that in operation a movement of the hand-lever will give an initial movement to the slide-valve (the piston in the meantime remaining unmoved) to establish a train-pipe connection which will bring about the change in train-pipe pressure necessary to release or apply the brakes, as desired, and then this change taking place also at one side of the piston will destroy the balance of forces acting thereon and the piston will move to establish a new balance and by reason of the link connections between it and the slide-valve move said valve to cut off the valvular communication initially established, and thereby discontinue the flow of air to or from the train-pipe.

Referring in detail to the valve structure, 10 designates the valve-body, which, together with oppositely-disposed heads 11 and 12 and the cap 13 thereon, incloses the valve, piston, and link mechanism. Main-reservoir and train-pipe connections R and T at the lower side of said valve-body communicate with chambers therein, the former with the chamber R', which is located at one side of the double piston 14, and the latter with the chamber T', which is in constant communication by way of the contracted port 15 and port 16 with the chamber T² at the left of said piston 14, the piston forming a movable partition between train-pipe and main-reservoir pressures. A chamber R², located within the cap 13, forms a continuation of the chamber R', and a chamber A', adjacent to the chamber T', is in constant communication with the atmosphere through the exhaust-port A.

The piston 14, which constitutes the movable partition between the chambers R' and T², is provided with heads 17 18 of unequal diameter fitted within cylindrical bores in the valve-body and adapted to reciprocate therein, the latter head forming one wall of the chamber T² and the former a wall of the chamber R'. Suitable packing-leathers 19 20 on said heads by pressing against the interior of the cylindrical bores prevent the escape of air from the chambers R' and T² past the piston-heads to the chamber C, located between said heads. A port 21 places the chamber C in constant communication with atmosphere, so that the air-pressure exerted on the right of the head 18 and on the left of the head 17 is constant. A spring 22 is located within the chamber C and abuts at one end against the right side of the piston-head 18 and at the other against a ring 23, which bears against an annular shoulder in the wall of said chamber. In the operation of this piston it will be seen that the pressure exerted by the air in the chamber R' remains constant, while that in the chamber T² may be varied, and that the pressure exerted by the spring 22 is variable and decreases as the piston is moved toward the left and the spring is allowed to expand. From this it follows that the piston may be made to occupy different positions between the limiting positions (shown in Figs. 1 and 6) by simply varying the pressure of the air in the chamber T². If, for example, the pressure in the chamber T² is just sufficient to maintain the piston in the position shown in Fig. 1 and said pressure is subsequently reduced ten pounds, the piston 14 will move, by reason of the greater pressure on its right, toward the left until the pressure exerted by the spring 22 is reduced ten pounds by reason of its expansion. Similarly a further decrease in pressure will produce a further movement, while increases will cause a movement of the piston toward the right, and in any case such movement will continue until the forces acting on the opposite sides of the piston become equal.

The slide-valve 24, which coöperates with the piston and other parts of the valve, is located within the chamber R² and is adapted to reciprocate upon the valve-seat 25, which forms the lower wall of said chamber. The under side of the valve 24 is provided with a recess or groove 26, which, together with an extended lip 27, coöperates with the seat-ports 28, 29, and 30 to control the passage of air to and from the train-pipe. Of these seat-ports the ports 28 and 29 are in direct and unobstructed communication with the atmospheric chamber A' and train-pipe chamber T', respectively, and the port 30 forms a feed-passage between the chamber R² and the train-pipe chamber T', which is provided with a feed-valve 31, which acts as a check-valve to maintain a constant difference of pressure between said chambers, and thereby between the main reservoir and the train-pipe. As clearly illustrated in Fig. 8, the parts of the feed-valve 31 are so disposed that the train-pipe pressure assists the spring and tends to force the valve into closed position in opposition to main-reservoir pressure, so that it follows that whenever the train-pipe pressure falls below the point for which the feed-valve has been set the main-reservoir pressure predominates and opens the valve and allows air to be fed from the chamber R² to the chamber T' and thence to the train-pipe. The difference between the main-reservoir and train-pipe pressures may be varied at will by simply turning the adjusting-nut 32, so as to increase or decrease the effective pressure of the feed-valve spring 33. The port 29 is T-shaped and is so located that in the movement of the slide-valve 24 toward the left from the positions illustrated in Figs. 1 and 3 communication with the groove 26 is first established through the narrow portion of said port 29, and in the continued movement of said valve toward the left the port area gradually increases at a uniform rate until the groove 26 begins to overlap the broad portion of the port 29, and then the port area is suddenly increased. The purpose of this sudden increase of port area is to permit a rapid escape of the air from the train-pipe in making an emergency application of the brakes, as will be hereinafter more fully pointed out. The valve 24 is provided with a stem 34, which extends lengthwise of the chamber R² through fixed guides 35 and 36 and is adapted to reciprocate therein and communicate its motion to said valve 24 through the agency of a head 37 on said stem and coöperating lugs 38 38 on the upper side of said valve.

The hand or controlling lever 39, which operates to give the initial movement to the valve 24, extends upward from one side of the valve-casing, to which it is secured by a pivot 40, into a position to be readily grasped by the operator. A notched segment 41, located on an adjacent flange of the cap 13, coöperates with a spring-pressed pawl 42 on the controlling-lever to yieldingly hold said lever at different points corresponding to different positions of the valve mechanism.

The link mechanism by which the slide-valve 24, piston 14, and hand-lever 39 are connected is located in the chamber R' and consists, primarily, of a lever 43, connected at one end to said valve and at the other to said piston, and an intermediate connection between said lever 43 and said hand-lever 39, by which a movement of the hand-lever will rock said lever about its connection with the piston to move the valve and a movement of the piston will rock said lever about its connection with said hand-lever to move said valve. In the embodiment shown the lever 43 is pivotally connected at its upper end to an intermediate point in the valve-stem 34 and at its lower end to the piston 14 by pivoted links 44 44. The intermediate connection is provided by links 45 45, which are pivotally secured to cranks 46 46, mounted on a squared portion of the pivot 40. The link mechanism thus forms a positive and unyielding connection between the valve 24 and hand-lever 39 such that in operation when any movement whatsoever is given to the hand-lever it will be communicated immediately to the valve.

In the operation of the above valve mechanism it will be apparent that after the movable parts have come to rest any movement of the controlling-lever to the left will move the valve 24 to the left, and if this movement is sufficient to bring the chambers T' and A' into communication air will escape from the train-pipe and the chamber $T^2$, and thereby cause the piston 14 to move to the left as the train-pipe pressure falls off and continue to move as long as the communication between the chambers T' and A' remains; but it will also be clear that such movement of the piston will cause the valve 24 to move to the right to gradually reduce the area of the escape-opening and finally close it, and thus bring the valve, the piston, and connecting parts again to rest. Similarly any movement of the controlling-lever toward the right will move the valve toward the right, and if this movement is sufficient to admit air from the chamber $R^2$ to the chamber T' either through the feed-port 30 or the port 29 the pressure of the air in the chamber $T^2$ will be increased and will move the piston toward the right, and thereby the valve toward the left, until the valve finally closes the ports 29 and 30. Thus it will be seen that the valve 24 always receives an initial movement in one direction from the hand-lever and a subsequent movement in the opposite direction from the piston.

The amount of train-pipe-pressure variation resulting from any given movement of the controlling-lever and the suddenness of the brake application or release caused thereby depends upon the extent of the movement of the controlling-lever. If this movement be such as to provide only a small port area, the change in train-pipe pressure will be necessarily small and gradual, whereas if a large area is provided by a considerable movement of the lever the change will be large and sudden. From this it follows that the controlling-lever may be moved from one extreme position to the other by short steps and the train-pipe will be subjected to gradual change through the entire range of pressure variation, whereas if the movement be made in one long step the same difference of pressure will result practically instantaneously. In order that this may be more apparent, it may be well to consider the operation of the parts as they occur in actual service.

Beginning with the condition when all air is off the system, the spring 22 being unrestrained will expand to its full extent and move the piston 14 toward the left until it brings up against the head 11 of the valve-casing in the position illustrated in Fig. 6. The valve 24, however, will not necessarily be in the position shown in this figure, but may occupy any one of a number of positions, ranging from the position of Fig. 3 to that of Fig. 6.

Figure 3:
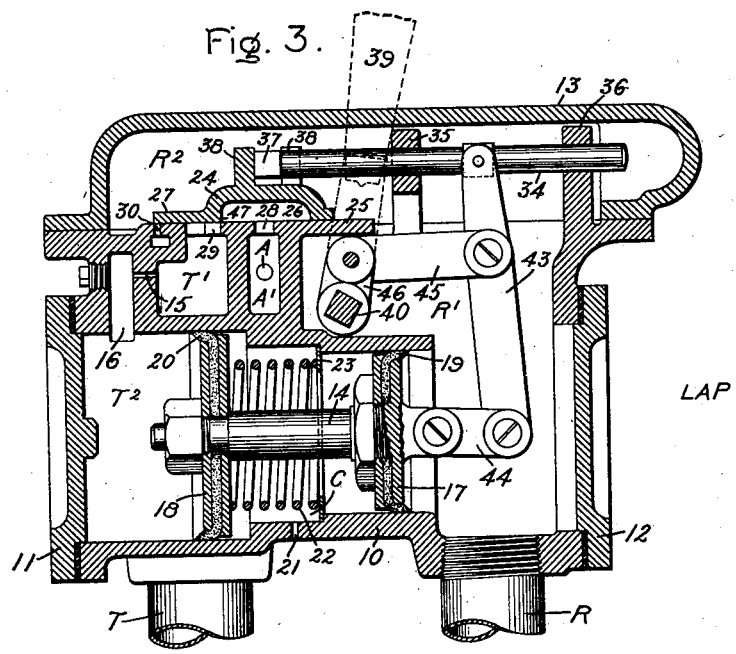

If the main reservoir is brought up to pressure while the valve is in any of the above positions except that of Fig. 3, air will flow from the chamber $R^2$ through the feed-port 30 or both ports 29 and 30 to the train-pipe, and the resulting increased pressure in the chamber $T^2$ will force the piston to the right until a position is reached in which the opposing forces acting thereon equalize. This movement of the piston will cause the valve to move to the left to cut off the supply, as previously indicated. On the other hand, if the main reservoir is brought up to pressure while the valve is in the position shown in Fig. 3 no air will be fed to the train-pipe until the controlling-lever is moved, and then, as in the previous case, the amount of air fed thereto will depend upon the extent of the movement of the lever.

Assuming then that the main reservoir has been brought up to pressure and that the train-pipe has been partially charged according to some intermediate position of the controlling-lever, when it is desired to start the car or train the controlling-lever is thrown over toward the right into the running position. This movement of the lever will operate the slide-valve 24 to uncover the port 30 or, if the movement of said lever is considerable, also a portion of the port 29, and air will be fed to the train-pipe, and by reason of the increased pressure in the chamber $T^2$ the various parts will be moved to the position illustrated in Fig. 1.

Figure 2:
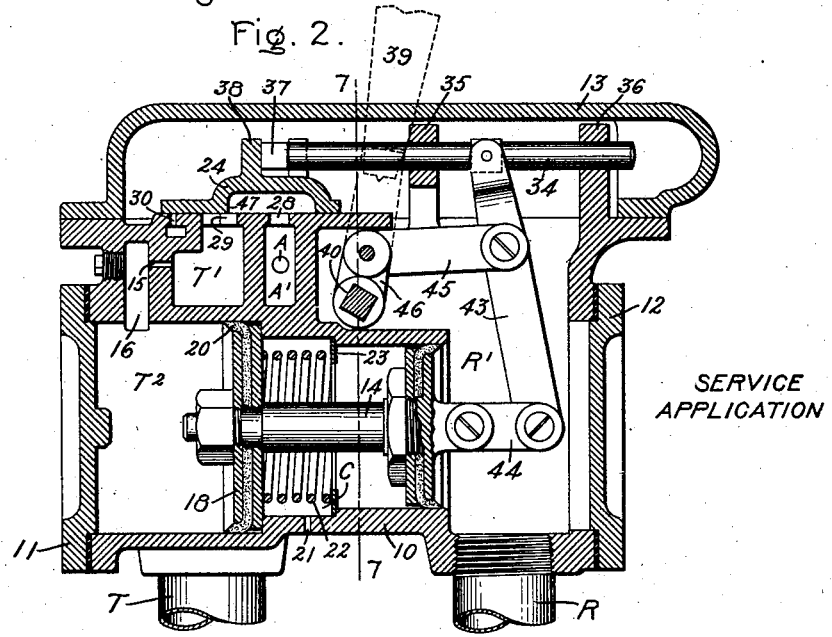

When it is desired to make a service application of the brakes, the controlling-lever is moved from the running position, in which the pawl 42 engages the notch $R^3$ in the segment 41, toward the left to any one of the "service" positions—that is, until the said pawl engages any one of the notches $G'$ $G^2$ $G^3$ $G^4$. This movement of the operating-lever will move the slide-valve toward the left until the groove 26 on the under side thereof overlaps more or less of the narrow portion of the port 29, as illustrated in Fig. 2, thus providing a more or less constricted passage between the chambers T' and A', by which air will escape from the train-pipe until the pressure in the chamber $T^2$ has fallen sufficiently to permit the piston to move toward the left, and thereby return the valve to the lap position, (illustrated in Fig. 3,) by which communication with the main reservoir and atmosphere is completely cut off. The notches G' G² G³ G⁴ in the segment 41 are so located that when the controlling-lever is thrown from the running position to any one of the service positions the groove 26 on the under side of the slide-valve 24 will overlap more or less of the narrow portion of the port 29, according to the extent of movement of the valve, but will not overlap the broad portion of said port. If the controlling-lever is moved from the running position to the last of these positions, in which the pawl 42 engages the notch G⁴, the forward edge 47 of the groove 26 on the under side of the slide-valve will lie directly above the line of separation between the broad and narrow portions of the port 29. On the other hand, the notch G' is so located that when the controlling-lever is moved from the running position toward the left until the pawl 42 engages said notch the groove 26 of the slide-valve 24 overlaps the narrow portion of the port 29 sufficiently to allow a train-pipe reduction sufficient to operate the triple valves of the system.

It will be apparent that in moving the controlling-lever through the different service positions from that corresponding to notch G' to that corresponding to notch G⁴ if the movement be taken step by step, with sufficient time intervening to permit the movable parts of the mechanism to come to rest before the next movement is made, varying reductions in train-pipe pressure and consequent corresponding brake-shoe pressures will be obtained, the reductions increasing step by step as the lever is moved to the left. Each of these step-by-step movements of the controlling-lever will cause the slide-valve to move, as before, toward the left to establish communication between the chambers T' and A', and air will escape from the train-pipe as before until the piston is moved to the new position and the slide-valve again closes the port 29.

Since the only essential in obtaining these graduated service applications of the brakes is that the slide-valve shall in each movement be moved from the lap position toward the left only a sufficient amount to permit the groove 26 to overlap a small part of the narrow portion of the T-shaped port 29 and not any part of the broad portion, and since after a movement of the controlling-lever to the last service position, corresponding to the notch G⁴, the slide-valve is left in lap position, it follows that still further gradual train-pipe reductions may be obtained by moving the controlling-lever still farther to the left from the G⁴ position by short steps, and, as previously stated, this may be continued until the said lever has reached its extreme left position—that is, the emergency position. (Illustrated in Fig. 5.)

When it is desired to make an emergency application of the brakes, the controlling-lever 39 is thrown over from the running position to the extreme left and the slide-valve 24 is brought to the position illustrated in Fig. 5, whereby the whole of the port 29 is placed in communication with the groove 26 in the valve 24 and a wide opening is established between the train-pipe chamber T' and the atmospheric chamber A', so that air may quickly escape and produce a violent and sudden application of the brakes. This reduction of pressure will be communicated through the ports 15 and 16 to the chamber T², as in other cases; but by reason of the small port 15 the reduction in said chamber T² will be gradual, so that the piston 14 will not be forced over to the left until sufficient air has escaped from the train-pipe to bring about the necessary brake application. As the pressure of the air in the chamber T² falls off, as in other cases, the predominating pressure upon the right of the piston 14 will force it to the left, and thereby bring the slide-valve to the lap position.

Figure 4:
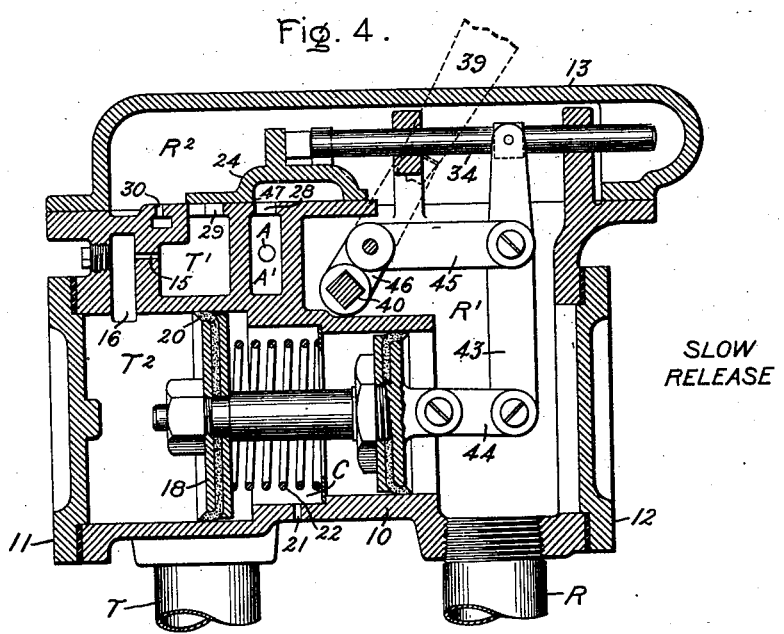

When it is desired to fully release the brakes after either a service or an emergency application, the controlling-lever 39 is thrown over to the extreme right into the running position. This movement of the lever will move the slide-valve 24 toward the right from the lap position, (illustrated in Fig. 3), to uncover either the feed-port 30 alone, as illustrated in Fig. 4, or the feed-port 30 and a portion of port 29, as illustrated in Fig. 6, according to the position of the piston resulting from the previous brake application. The uncovering of the port 30 or the ports 29 and 30 will establish communication between the main-reservoir chamber R² and the train-pipe chamber T', and air will be fed into the train-pipe and also into the chamber T² until the train-pipe is brought up to pressure. The increase of pressure in the chamber T² will force the piston, and consequently the valve 24, to the positions illustrated in Fig. 1; but, as there indicated, the movement of the valve will be insufficient to close the port 30, so that when the parts have come to rest the train-pipe pressure may still be maintained normal through the agency of the feed-valve.

If it is desired to only partially release the brakes, as may be necessary when operating upon long grades, the controlling-lever 39 is thrown toward the right to any one of the intermediate positions between the emergency position and the running position and a corresponding increase of train-pipe pressure, depending upon the extent of such movement, is obtained. By each movement, the slide-valve 24 is moved to the right until it uncovers one or both of the ports 29 and 30, and air is fed to the train-pipe and the chamber T² until the increased pressure in said chamber forces the piston toward the right far enough to move the valve 24 toward the left to the lap position, thereby cutting off the supply of air and bringing the parts to rest. Further movements of the controlling-lever to the right will bring about further increases in train-pipe pressure, each movement causing the valve to move toward the right to establish communication between the chambers R² and T' and permitting air to flow to the train-pipe, as before, until the piston is moved to a new position and the slide-valve again closes the supply-ports. Thus it is apparent that in both releasing and applying the brakes the train-pipe pressure may be varied throughout the entire range of pressures either gradually or suddenly, as desired, and that the movement of the controlling-lever toward the right or left to any given position will operate to bring about a predetermined pressure in the train-pipe—a certain definite pressure corresponding to each position of the lever.

It is apparent that the proportions of the piston-heads and the strength of the spring 22 may be varied to suit the requirement of any given case and that many modifications and alterations may be made in the mechanism shown without departing from the spirit of my invention. Therefore I do not wish to be limited to the specific construction herein shown, but aim to cover by the terms of the appended claims all such alterations and modifications.

What I claim as new, and desire to secure by Letters Patent of the United States, is—

1. In a regulating-valve for air-brake systems, the combination of a valve for controlling the passage of air to and from the train-pipe, manually-operated means having a positive and unyielding connection with said valve for initially moving it to supply compressed air to the train-pipe, and pneumatically-operated means connected to said valve and responsive to the resulting increased train-pipe pressure to move said valve to cut off said supply.

2. In a regulating-valve for air-brake systems, the combination of a slide-valve for controlling the passage of air to and from the train-pipe, manually-operated means having a positive and unyielding connection with said valve for initially moving it to supply compressed air to the train-pipe, and pneumatically-operated means responsive to the resulting increased train-pipe pressure to move said valve to cut off said supply.

3. A regulating-valve for air-brake systems, comprising a casing provided with main reservoir, train-pipe and exhaust ports and connections, a valve for controlling communication between said ports, a lever pivoted to said casing and having a positive and unyielding connection with said valve and operable to move the valve to establish communication between said main-reservoir and train-pipe ports, and a movable member connected to said valve and subjected to train-pipe pressure and movable upon an increase of such pressure to move said valve to cut off said communication between the main reservoir and train-pipe ports.

4. In a regulating-valve for air-brake systems, the combination of a valve for controlling the passage of air to and from the train-pipe, manually-operated means having a positive and unyielding connection with said valve for initially moving it to permit the air to escape from said train-pipe, and pneumatically-operated means responsive to the resulting decreased train-pipe pressure to move said valve to cut off said escape.

5. A regulating-valve for air-brake systems, comprising a casing provided with main-reservoir, train-pipe and exhaust ports and connections, a valve for controlling communication between said ports, a lever pivoted to said casing and having a positive and unyielding connection with said valve and operable to move the valve to establish communication between said train-pipe and exhaust ports, and a movable member connected to said valve and subjected to train-pipe pressure and movable upon a decrease of such pressure to move said valve to cut off said communication between the train-pipe and exhaust ports.

6. In a regulating-valve for air-brake systems, the combination of a valve for controlling the passage of air to and from the train-pipe, manually-operated means having a positive and unyielding connection with said valve for initially moving it, in one braking operation, to a position to admit compressed air to the train-pipe and in the other braking operation to a position to permit the escape of air from the train-pipe, and pneumatically-operated means responsive to the resulting increase or decrease of train-pipe pressure to move said valve to cut off said supply or exhaust respectively.

7. A regulating-valve for air-brake systems, comprising a casing provided with main-reservoir, train-pipe and exhaust ports and connections, a valve for controlling communication between said ports, a lever pivoted to said casing and having a positive and unyielding connection with said valve and operable to move the valve, in one braking operation, to establish communication between said main-reservoir and train-pipe ports and in another braking operation to establish communication between said train-pipe and exhaust ports, and a movable member connected to said valve and subjected to train-pipe pressure and operable upon an increase in such pressure to move said valve to cut off the communication between said main-reservoir and train-pipe ports and operable upon a decrease of such pressure to cut off the communication between said train-pipe and exhaust ports.

8. A regulating-valve for air-brake systems, comprising a casing provided with main-reservoir, train-pipe and exhaust ports and connections, a valve for controlling communication between said ports and thereby the passage of air to and from the train-pipe, a piston, a controlling-lever pivoted to said casing, a connecting-lever connected at one point to said piston, at another to said valve and at another to said controlling-lever, said controlling-lever being operable to move said connecting-lever about its connection with said piston to move said valve and said piston being operable upon changes in train-pipe pressure to move said connecting-lever about its connection with said controlling-lever also to move said valve.

9. A regulating-valve for air-brake systems, comprising a casing provided with main-reservoir, train-pipe and exhaust ports and connections, a valve for controlling communication between said ports and thereby the passage of air to and from the train-pipe, a piston subjected to opposing train-pipe and main-reservoir pressures, a controlling-lever pivoted to said casing, a connecting-lever connected at one point to said piston, at another to said valve and at another to said controlling-lever, said controlling-lever being operable to move said connecting-lever about its connection with said piston to move said valve to establish a communication whereby the train-pipe pressure will be changed and the piston thereby operated to move said connecting-link about its connection with said controlling-lever to move said valve to cut off said communication.

10. A regulating-valve for air-brake systems, comprising a casing provided with main-reservoir, train-pipe and exhaust ports and connections, a valve for controlling communication between said ports and thereby the passage of air to and from the train-pipe, means having a positive and unyielding connection with said valve for setting it in advance for any desired train-pipe pressure whereby the necessary communication is established between said ports to charge or exhaust the train-pipe as may be required, and means for automatically cutting off said communication when the predetermined pressure has been reached.

In witness whereof I have hereunto set my hand this 12th day of August, 1903.

FRED B. COREY.

Witnesses:
BENJAMIN B. HULL,
HELEN ORFORD.